United States Patent
Akiyama et al.

(10) Patent No.: US 7,814,803 B2
(45) Date of Patent: Oct. 19, 2010

(54) TORQUE SENSOR

(75) Inventors: Shinji Akiyama, Maebashi (JP); Kouichi Satoh, Maebashi (JP)

(73) Assignee: NSK Ltd., Tokyo (JP)

( * ) Notice: Subject to any disclaimer, the term of this patent is extended or adjusted under 35 U.S.C. 154(b) by 127 days.

(21) Appl. No.: 12/281,450

(22) PCT Filed: Feb. 20, 2007

(86) PCT No.: PCT/JP2007/053104

§ 371 (c)(1), (2), (4) Date: Sep. 2, 2008

(87) PCT Pub. No.: WO2007/099818

PCT Pub. Date: Sep. 7, 2007

(65) Prior Publication Data

US 2009/0013795 A1  Jan. 15, 2009

(30) Foreign Application Priority Data

Mar. 2, 2006 (JP) ............................. 2006-055717
Mar. 2, 2006 (JP) ............................. 2006-055718

(51) Int. Cl.
G01L 3/00 (2006.01)
(52) U.S. Cl. .................. 73/862.333; 73/862.331
(58) Field of Classification Search ................ 73/862.331–862.333
See application file for complete search history.

(56) References Cited

U.S. PATENT DOCUMENTS 5,641,916 A * 6/1997 Satoh et al. ............ 73/862.331

2007/0209864 A1 * 9/2007 Segawa et al. .............. 180/446

FOREIGN PATENT DOCUMENTS

| JP | 09-101212 A | 4/1997 |
|---|---|---|
| JP | 10-078358 A | 3/1998 |
| JP | 11-248561 A | 9/1999 |
| JP | 2001-272288 A | 10/2001 |
| JP | 2003-095117 A | 4/2003 |
| JP | 2005-195608 A | 7/2005 |
| WO | 2004/009424 A1 | 1/2004 |
| WO | 2004/018987 A1 | 3/2004 |
| WO | 2005097577 A1 | 10/2005 |

* cited by examiner

*Primary Examiner*—Max Noori
(74) *Attorney, Agent, or Firm*—Sughrue Mion, PLLC

(57) ABSTRACT

A change in a magnetic resistance generated between a plurality of windows of a cylindrical member formed by a non-magnetic material and a torsion bar is regarded to be a change in inductances of detecting coils to detect a steering torque. Coil yokes accommodating the detecting coils therein are disposed coaxially on an outer periphery of the cylindrical member and L-shaped bent tip portions of output terminals of the detecting coils are inserted into a hole of a circuit board of a control module. Terminal holding portions are provided on an inside of a moving track so that an interference with other components can be prevented. The circuit board of the control module is disposed perpendicularly to a direction of shaft centers of an input and output shafts. An output terminal of a detecting coil has a tip portion bent to take an L shape and formed perpendicularly to the hole of the circuit board. Therefore, the detecting coil and the control module can be directly connected. When a gear box mounting the control module thereon is to be disposed in a small engine room, space efficiency can be increased and a shock absorbing stroke of a shock absorbing mechanism can be maintained sufficiently.

3 Claims, 9 Drawing Sheets

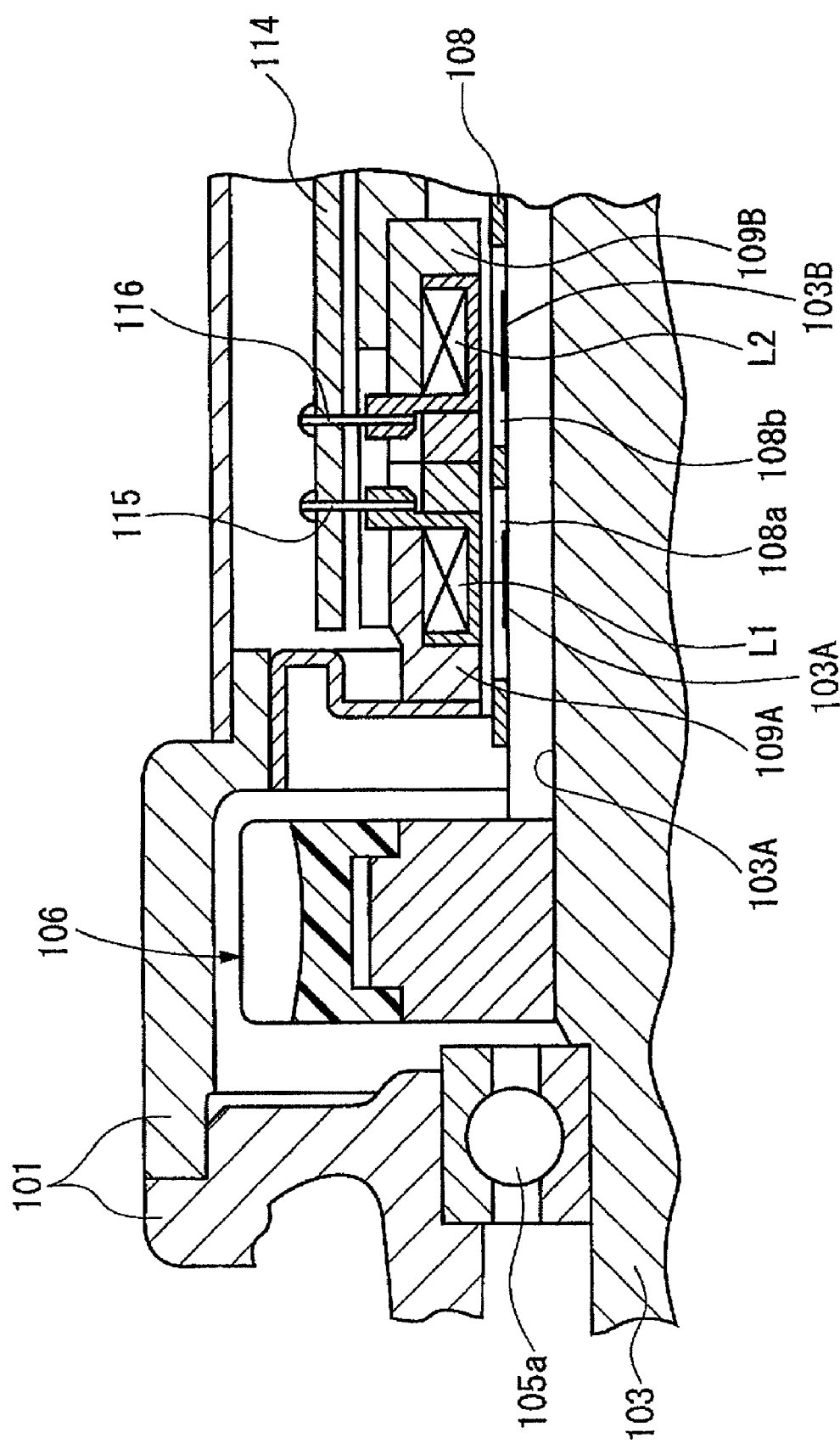

TORQUE SENSOR

TECHNICAL FIELD

The present invention relates to a torque sensor for detecting a torque through a torsion between an input shaft and an output shaft, and more particularly to a structure of a torque sensor which is applied to an electric power steering apparatus for a vehicle.

RELATED ART

An electric power steering apparatus for a vehicle has such a structure as to detect a steering torque generated on a steering shaft for coupling a steering handle to a steering mechanism, to control an output of a motor based on the steering torque thus detected and a speed detected by a speed sensor, and to transmit a driving force of the motor to the steering shaft through another decelerating mechanism, thereby assisting the steering torque of a steering handle properly.

In a control device for the electric power steering apparatus, it is necessary to provide a plurality of circuits such as a torque detecting circuit for detecting a steering torque, a control circuit for controlling a magnitude of a motor current based on the steering torque thus detected, and a motor driving circuit for driving a motor with a duty ratio determined based on a control value of the motor current output from the control circuit, and the respective circuits are gathered into a plurality of circuit modules such as a sensor module, a control module and a power module and they are individually disposed in the vicinity of a gear box of the steering apparatus. However, there is a disadvantage that the number of components and an assembly man-hour are increased. For this reason, the circuit modules are further collected and attached to the gear box of the steering apparatus.

On the other hand, there has been known a torque sensor having such a structure as to use a detecting coil for detecting, as a change in an inductance, a magnetic resistance varied depending on a torsion angle of a torsion bar connected to a steering shaft, to dispose a coil yoke accommodating the detecting coil close to the gear box and to connect a terminal of the detecting coil to a circuit module when using the gear box having the structure described above (see Patent Document 1).

FIG. 8 is a sectional view showing the gear box having the structure described above, and FIG. 9 is an enlarged sectional view showing a connecting portion for connecting the terminal of the detecting coil to the circuit module.

With reference to FIGS. 8 and 9, brief description will be given to a structure and operation of a torque detecting portion. An input shaft 102 and an output shaft 103 coupled to each other through a torsion bar 104 is disposed in a housing 101, and the output shaft 103 is rotatably supported through ball bearings 105a and 105b. The input shaft 102, the torsion bar 104 and the output shaft 103 are coaxially disposed, the input shaft 102 and the torsion bar 104 are spline coupled to each other, and the torsion bar 104 and the output shaft 103 are pin coupled to each other.

A worm wheel 106 is coupled to the output shaft 103 and is engaged with a worm 107b coupled to a shaft 107a of the electric motor 107.

A cylindrical member 108 including a plurality of windows 108a and 108b constituted by a nonmagnetic material such as aluminum and disposed at a regular interval in a circumferential direction is fixed to an end of a sleeve 102A fixed to an end of the input shaft 102. On the other hand, the output shaft 103 is constituted by a magnetic material and has a plurality of convex portions 103A and 103B formed in corresponding positions to the windows 108a and 108b of the cylindrical member 108. Moreover, coil yokes 109A and 109B including detecting coils L1 and L2 are coaxially disposed on an outer periphery of the cylindrical member 108 in the housing 101.

With the structure, when a rotating force acts on the input shaft 102, it is transmitted to the output shaft 103 through the torsion bar 104 and a shift is generated on the windows 108a and 108b of the cylindrical member 108 on the input shaft side and the convex portions 103A and 103B on the output shaft side due to a torsion generated on the torsion bar 104, and the areas of the convex portions 103A and 103B on the output shaft 103 side which are formed by a plurality of magnetic materials and are exposed through the windows 108a and 108b of the cylindrical member on the input shaft 102 side which are formed by a nonmagnetic material are increased or decreased, and inductances of the detecting coils L1 and L2 are increased or decreased. By detecting a change in the inductances of the detecting coils L1 and L2, it is possible to detect a magnitude of the torsion generated on the torsion bar 104, that is, a magnitude of the torque acting on the input shaft 102.

The connecting portion for connecting the terminal of the detecting coil to the circuit module will be described with reference to FIG. 9.

114 denotes a circuit board of the circuit module, and 115 and 116 denote terminal pins of the detecting coils L1 and L2. As is apparent from FIG. 9, the terminal of the detecting coil and the circuit board are disposed in parallel in directions of axis centers of the input and output shafts, and this depends on the structures of the detecting coil and the circuit board.

Patent Document 1: JP-A-9-1012122

DISCLOSURE OF THE INVENTION

Problems to be Solved

With the structure, however, the output terminals of the detecting coils L1 and L2 are erected vertically toward the circuit board of the circuit module. As a result, the outside diameter of the coil yoke 109A is increased so that it is demanded to reduce the height of the output terminal of the detecting coil.

Moreover, two detecting coils are assembled with a rotation around the shaft centers of the input and output shafts when they are to be assembled into the housing. For this reason, it is necessary to provide a detent. In order to connect the output terminal of the detecting coil to the circuit board of the circuit module, furthermore, it is necessary to set an angle in a rotating direction of the output terminal with high precision.

When the circuit board is disposed in parallel in the directions of the shaft centers of the input and output shafts as described above, moreover, lengths in an axial direction of the input and output shafts of the gear box are increased. When it is demanded to dispose the gear box in a small engine room, there is a drawback, that is, a disadvantage is made in respect of a space, and furthermore, it is hard to sufficiently maintain a shock absorbing stroke of a shock absorbing mechanism which is obliged to be disposed in the middle of the steering shaft. It is an object of the invention to solve the problems.

Means for Solving the Problems

In order to solve the problems, according to claim 1, there is provided a torque sensor for detecting a torque through a torsion between an input shaft and an output shaft, including:

two pieces of detecting coils for detecting the torque, and a control module connected to an output terminal of the detecting coil and processing a detection signal output from the detecting coil, wherein a circuit board of the control module is disposed perpendicularly to a direction of shaft centers of the input shaft and the output shaft which are disposed coaxially, and the detecting coil is disposed rotatably around the shaft center in a housing in which the input shaft and the output shaft are accommodated.

Preferably, the two pieces of detecting coils are accommodated in coil yokes respectively, and include a rotation regulating member for regulating mutual rotating angles.

Moreover, preferably, the coil yoke includes a terminal holding portion for holding the output terminal of the detecting coil, and the rotation regulating member is formed in the terminal holding portion.

Further, preferably, the output terminal of the detecting coil has a base portion held in the terminal holding portion and a tip portion bent at a right angle with respect to the base portion and formed to take an L shape, and the tip portion is provided on an inside of a moving track on an outer periphery of the terminal holding portion.

According to claim 5, there is provided a torque sensor of an electric power steering apparatus including:

two pieces of detecting coils for detecting, as a change in an inductance, a torsion between input and output shafts disposed coaxially which is generated through a steering torque, and a control module connected to an output terminal of the detecting coil and processing a detection signal output from the detecting coil, wherein a circuit board of the control module is disposed perpendicularly to a direction of shaft centers of the input shaft and the output shaft which are disposed coaxially, and the two pieces of detecting coils are disposed rotatably around the shaft centers in a housing in which the input shaft and the output shaft are accommodated.

Preferably, the two pieces of detecting coils are accommodated in coil yokes respectively, and include a rotation regulating member for regulating mutual rotating angles.

Moreover, preferably, the coil yoke includes a terminal holding portion for holding the output terminal of the detecting coil, and the rotation regulating member is formed in the terminal holding portion.

Further, preferably, the output terminal of the detecting coil has a base portion held in the terminal holding portion and a tip portion bent at a right angle with respect to the base portion and formed to take an L shape, and the tip portion is provided on an inside of a moving track on an outer periphery of the terminal holding portion.

According to claim 9, there is provided a torque sensor for detecting a torque through a torsion between an input shaft and an output shaft, including:

a detecting coil for detecting the torque, and a control module for processing a detection signal output from the detecting coil, wherein a circuit board of the control module is disposed perpendicularly to a direction of shaft centers of the input shaft and the output shaft which are disposed coaxially, and an output terminal of the detecting coil has a tip portion disposed perpendicularly to the circuit board of the control module.

Preferably, the output terminal of the detecting coil is constituted by a base portion connected to the detecting coil and a tip portion connected to the circuit board of the control module, and the tip portion is bent at a right angle with respect to the base portion and is formed to take an L shape.

Moreover, preferably, the output terminal of the detecting coil is a round pin having a round section.

According to claim 12, there is provided a torque sensor of an electric power steering apparatus including:

a detecting coil for detecting, as a change in an inductance, a torsion between input and output shafts disposed coaxially which is generated through a steering torque, and a control module for processing a detection signal output from the detecting coil, wherein a circuit board of the control module is disposed perpendicularly to a direction of shaft centers of the input shaft and the output shaft, and an output terminal of the detecting coil has a tip portion disposed perpendicularly to the circuit board of the control module.

Preferably, the output terminal of the detecting coil is constituted by a base portion connected to the detecting coil and a tip portion connected to the circuit board of the control module, and the tip portion is bent at a right angle with respect to the base portion and is formed to take an L shape.

Moreover, preferably, the output terminal of the detecting coil is a round pin having a round section.

Further, preferably, the output terminal of the detecting coil has a tip portion bent at a right angle with respect to a base portion and formed to take an L shape by using a bending punch and a die.

Advantage of the Invention

As described above, according to the first to fourth aspects of the invention, the torque detecting coil is disposed rotatably around the shaft center in the housing in which the input shaft and the output shaft are accommodated. Therefore, it is possible to carry out an assembly while rotating the torque detecting coil in the assembly so that a workability can be enhanced.

The two pieces of coil yokes for accommodating the detecting coil include the rotation regulating member for regulating the mutual rotating angles. Therefore, it is possible to set an angle in the rotating direction of the output terminal with high precision.

Moreover, the output terminal of the detecting coil has the base portion held in the terminal holding portion, and the tip portion is bent at a right angle with respect to the base portion and is thus formed to take an L shape. Therefore, it is possible to reduce the outside diameter of the coil yoke.

Furthermore, the tip portion of the output terminal of the detecting coil is caused to be placed on the inside of the moving track on the outer periphery of the terminal holding portion. By previously disposing the other members on the outside of the moving track, consequently, it is possible to eliminate an interference with the other members even if the detecting coil is rotated.

The fifth aspect of the invention is directed to the torque sensor of the electric power steering apparatus, and the structure of the detecting coil of the torque sensor is the same as that in the first aspect of the invention. Therefore, there is produced the same advantage as that in the first aspect of the invention.

In the torque sensor according to the ninth aspect of the invention, the circuit board of the control module is disposed perpendicularly to the direction of the shaft centers of the input and output shafts. Therefore, a space efficiency can be enhanced. When the output terminal of the detecting coil of the torque sensor has the tip portion bent to take an L shape and formed perpendicularly to the circuit board of the control module, it is possible to directly connect the detecting coil to the control module easily.

In the torque sensor of an electric power steering apparatus according to the twelfth aspect of the invention, the circuit board of the control module is disposed perpendicularly to the direction of the shaft centers of the input and output shafts. Therefore, a space efficiency can be enhanced and a shock absorbing stroke of a shock absorbing mechanism required for a steering mechanism can be maintained sufficiently. The output terminal of the detecting coil of the torque sensor is bent to take an L shape and is thus formed perpendicularly to the circuit board of the control module. Therefore, it is possible to directly connect the detecting coil to the control module easily.

Moreover, the round pin having a round section is used for the output terminal of the detecting coil. When the bending punch and the die are used in the bend processing for the tip portion, consequently, the round pin comes in line contact with the die. Therefore, it is possible to carry out the bend processing with high precision.

BRIEF DESCRIPTION OF THE DRAWINGS

FIG. 9 is an enlarged sectional view showing a connecting portion of a circuit board and a detecting coil of a torque sensor in the conventional electric power steering apparatus illustrated in FIG. 8.

DESCRIPTION OF REFERENCE SIGNS AND NUMERALS

Figure 1:
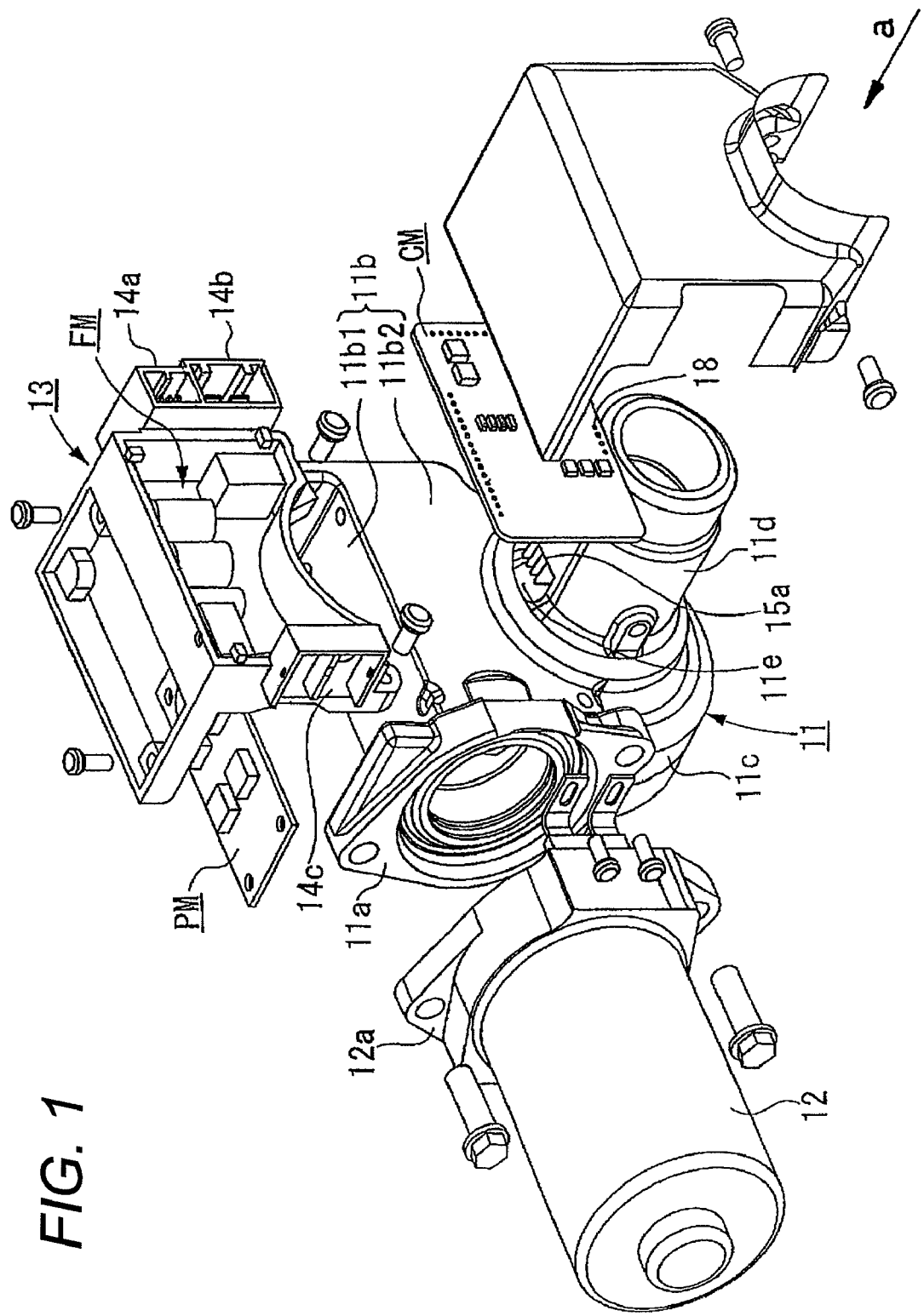
FIG. 1 is an exploded perspective view showing a main structure portion of an electric power steering apparatus.

11 gear box (gear box of steering apparatus)
11*a* motor attaching surface
11*b* box-shaped rectangular parallelepiped
11*b*1 first plane
11*b*2 second plane
11*c* semicircular box member
11*d* cylindrical member
11*e* opening portion
11*f* guide member
11*g* pressing member
12 motor
13 module attaching member
14*a* signal wire connector
14*b* power connector
14*c* motor terminal connector
15, 15*p*, 15*q* detecting coil (torque detecting coil)
15*a*, 15*a*1, 15*a*2 output terminal (output terminal of torque detecting coil)
16P, 16Q coil yoke
16P1 16Q1 terminal holding portion
18 through hole (connecting portion of circuit board)
215 torque detecting coil of torque sensor
215*a* output terminal of torque detecting coil
215*a*1 base portion (base portion of output terminal of torque detecting coil)
215*a*2 tip portion (tip portion of output terminal of torque detecting coil)
221 base plate
222 bending punch
223 die
PM power module
CM control module
FM frame module

BEST MODE FOR CARRYING OUT THE INVENTION

Figure 2:
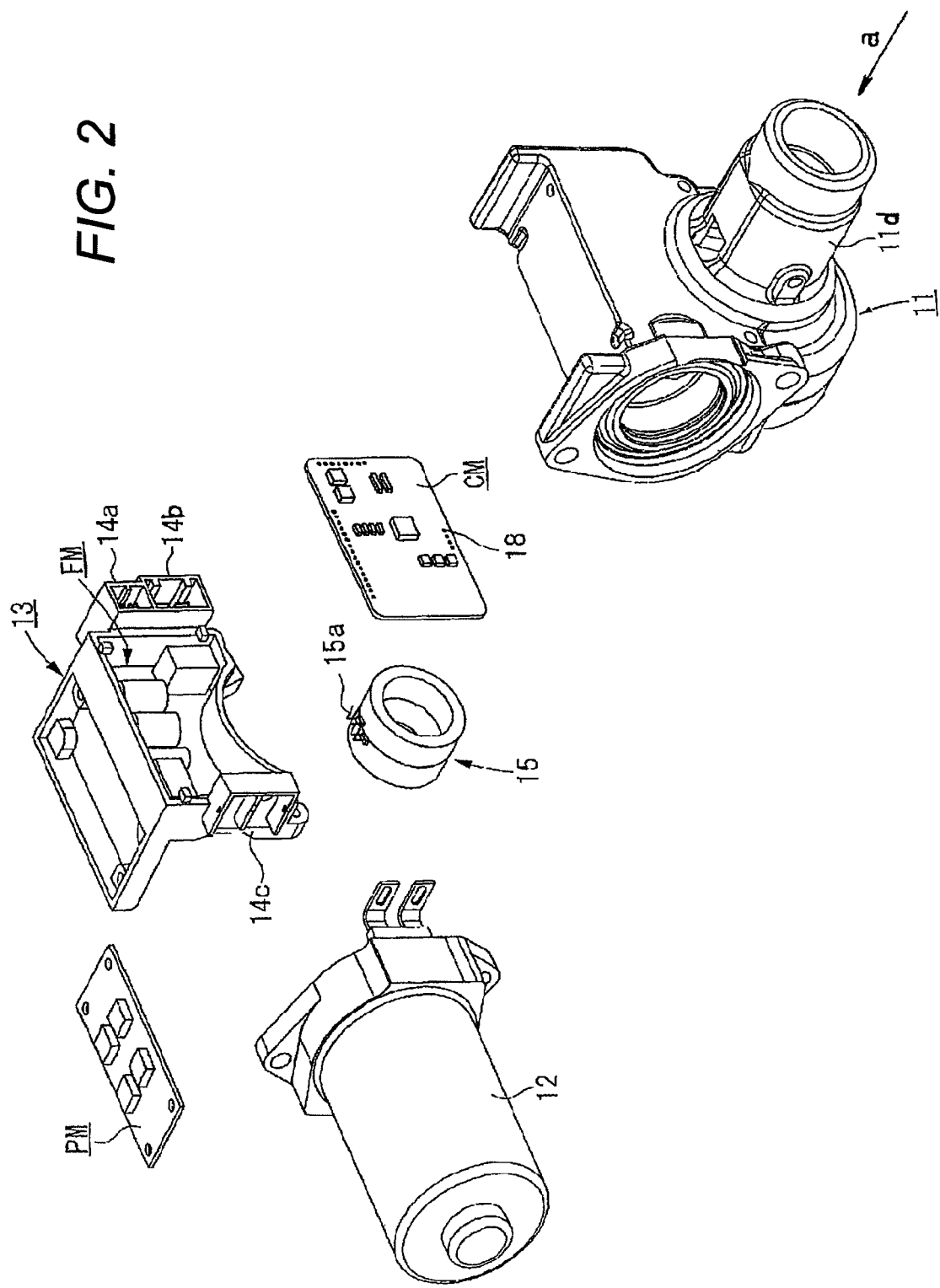
FIG. 2 is a perspective view for explaining a torque detecting coil of the electric power steering apparatus illustrated in FIG. 1 and a member related thereto.

The invention will be described below based on an embodiment applied to an electric power steering apparatus. FIG. 1 is an exploded perspective view showing a main structure portion of the electric power steering apparatus, and FIG. 2 is a perspective view showing a torque detecting coil and a member related thereto. In order to avoid a complicatedness of the drawings, a steering shaft, input and output shafts connected thereto and a decelerating mechanism are not shown.

Figure 8:
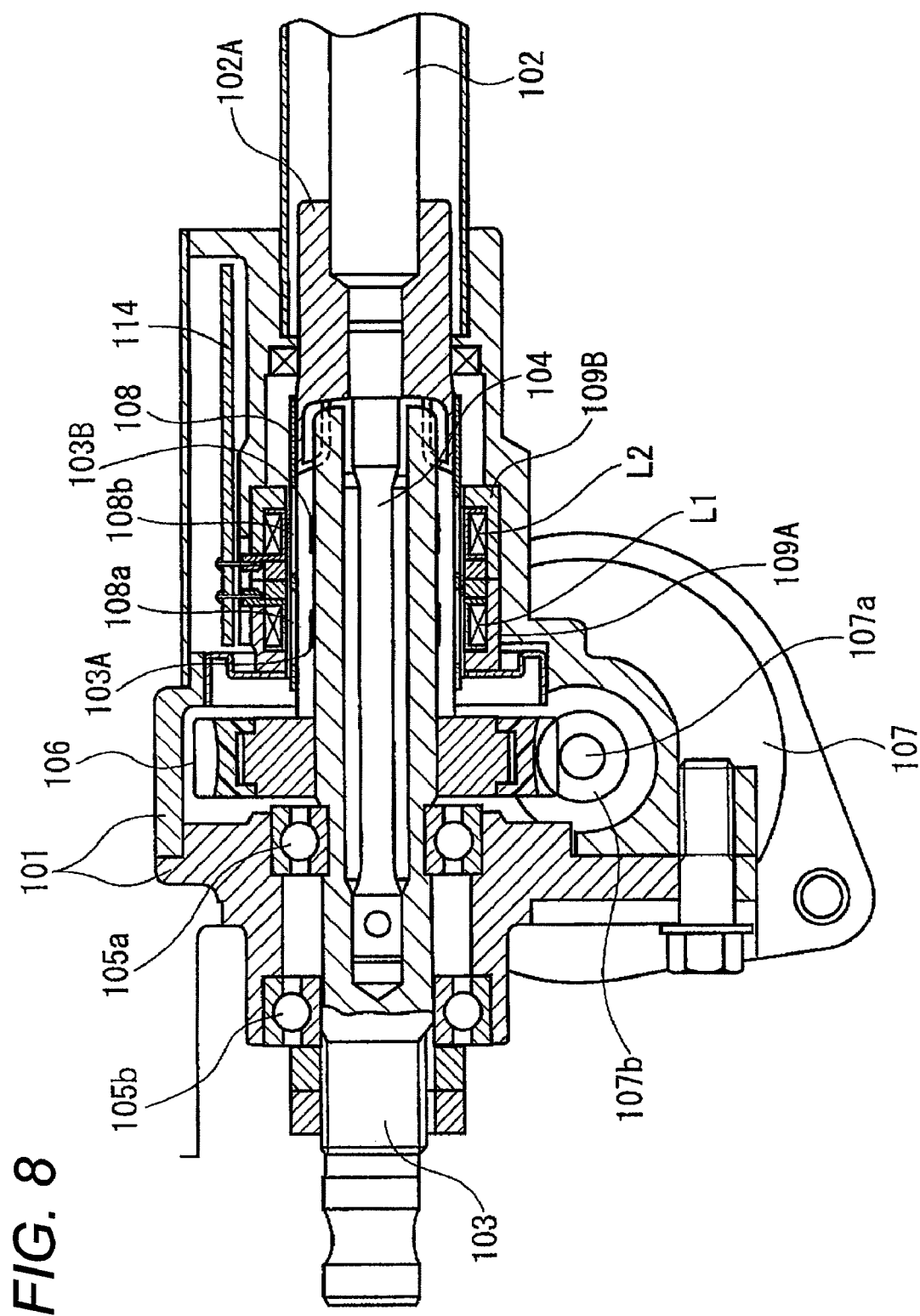
FIG. 8 is a sectional view for explaining an example of a structure of a main part of a conventional electric power steering apparatus.

In FIGS. 1 and 2, 11 denotes a gear box of the steering apparatus and 12 denotes a motor. A cylindrical input shaft coupled to a steering shaft, a torsion bar disposed coaxially therein, and an output shaft coupled to the torsion bar and disposed coaxially with the input shaft are rotatably supported with a penetration in a direction of an arrow a in the gear box 11, and a worm wheel which is not shown is coupled to the output shaft. Right lower and left upper sides of the arrow a indicate input and output shaft sides. Since structures of the input shaft, the torsion bar and the output shaft and a structure of a torque sensor are similar to the conventional structures described with reference to FIGS. 8 and 9 and are well known, detailed description will be omitted.

A flange 12*a* of the motor 12 is constituted to be fixed to a motor attaching surface 11*a* of the gear box 11 and a shaft of the motor 12 is constituted to be connectable with a worm shaft accommodated in the gear box 11, which is not shown. Moreover, it is apparent that the worm and the worm wheel are constituted to maintain a proper engaging state.

With reference to FIGS. 1 and 2, description will be given to structures and arrangements of individual members. The gear box 11 has an upper half formed to be a rectangular parallelepiped 11*b* taking a shape of a box in which the worm is accommodated, there are formed a first plane 11*b*1 provided on an outside of a shaft center of a motor shaft connected to a worm shaft and a second plane 11*b*2 on an input shaft side intersecting the first plane 11*b*1 to take an L shape at a right angle as seen from the engaging portion of the worm and the worm wheel, and the first plane 11*b*1 and the second plane 11*b*2 are used as attaching surfaces of a circuit module which will be described below.

Moreover, the first plane 11*b*1 is placed in a most separate position from the engaging portion intersecting the plane including the engaging portion and the shaft center of the motor shaft at an outside of the shaft center of the motor shaft as seen from the engaging portion of the worm and the worm wheel.

A lower half of the gear box 11 is formed to be a semicircular box member 11c in which the worm wheel is accommodated, and is formed integrally with the rectangular parallelepiped 11b taking a shape of a box. The semicircular box member 11c is provided with a cylindrical member 11d for holding a torque sensor for detecting a steering torque through a torsion of the torsion bar coupling the input shaft to the output shaft and a ball bearing of the input shaft, which is not shown, and an output terminal 15a of the torque detecting coil 15 of the torque sensor is exposed to an opening portion 11e provided close to the second plane 11b2 of the cylindrical member 11d.

A module attaching member 13 is attached opposite to the two surfaces, that is, the first plane 11b1 and the second plane 11b2 in the gear box 11 disposed to take the L shape, and is wholly formed to take the L shape with a synthetic resin. Circuit modules, that is, a power module PM constituting a motor driving power circuit which is formed by a switching transistor, a control module CM incorporating a control circuit and a torque detecting circuit therein, and a frame module FM incorporating a power circuit and other circuit elements are assembled into the module attaching member 13.

The module attaching member 13 is provided with a signal wire connector 14a for connecting a control signal wire between respective portions of a body, a power connector 14b for connecting a driving power supply (a battery) and a motor terminal connector 14c for connecting a motor terminal, and a wiring member for mutually connecting the circuit modules such as the power module PM, the control module CM and the frame module FM which are attached to the module attaching member 13 is incorporated therein. When the circuit modules are attached to the module attaching member 13, the mutual connection of the circuit modules is completed and the connection of the signal wire connector 14a, the power supply connector 14b and the motor terminal connector 14c is also completed.

The input shaft coupled to the steering shaft, the torsion bar and the output shaft are rotatably supported in the gear box 11, and a worm wheel constituting a decelerating mechanism is coupled to the output shaft and the worn to be engaged with the worm wheel is also supported rotatably through a bearing disposed in the gear box 11.

Moreover, the motor 12 is assembled in such a manner that a shaft of the motor 12 is coupled to a worm supported in the gear box 11 when it is fixed to the motor attaching surface 11a of the gear box 11, and the output shaft is rotated and driven through the decelerating mechanism including the worm and the worm wheel through a driving operation of the motor 12.

Moreover, the respective circuit modules of the power module PM, the control module CM and the frame module FM are finished to be freely incorporated, and a feeding terminal 12d of the motor 12 is finished to be freely incorporated into the motor terminal connector 14c provided in the frame module FM.

The control module CM is attached to the module attaching member 13 positioned on the outside of the frame module FM. A control signal terminal of the control module CM is electrically connected to a corresponding control signal terminal of the frame module FM, and furthermore, the output terminal 15a of the detecting coil 15 of the torque sensor exposed to the opening portion 11e close to the second plane 11b2 on the input shaft side of the gear box 11 is also connected electrically to a corresponding terminal of the control module CM.

The motor 12 is fixed to the motor attaching surface 11a of the gear box 11 with a screw. A rotating shaft of the motor 12 is coupled to a worm shaft accommodated in the gear box 11, and the feeding terminal 12d of the motor 12 is electrically connected through a fixation to the motor terminal connector 14c of the frame module FM.

Next, description will be given to the attachment of the control module CM and the detecting coil 15 of the torque sensor into the housing which is the structure of a feature portion according to the invention.

A circuit board of the control module CM attached to the module attaching member 13 is disposed on a perpendicular plane to the shaft centers of the input shaft, the torsion bar and the output shaft which are disposed coaxially. On the other hand, the detecting coil 15 of the torque sensor is disposed around the output shaft provided in the cylindrical member 11d.

Figure 3:
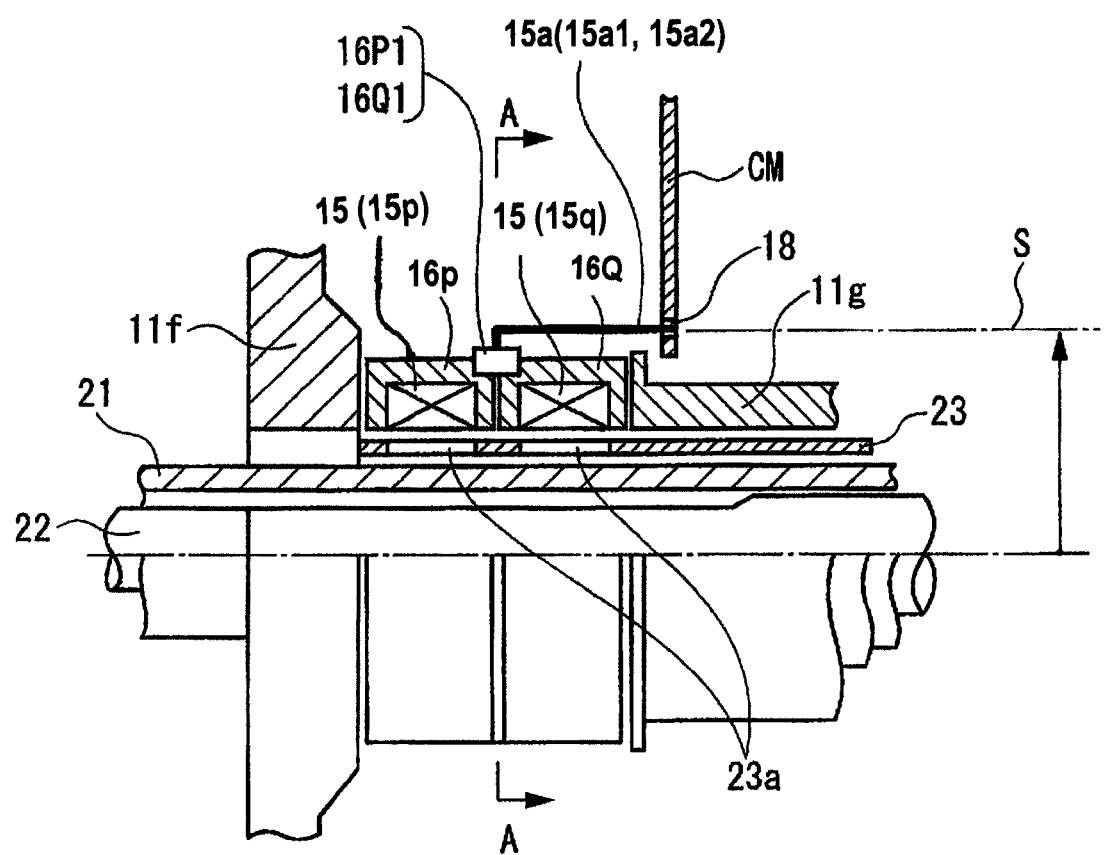
FIG. 3 is a sectional view in an axial direction for explaining an arrangement of a detecting coil of a torque sensor disposed in a gear box.
Figure 4:
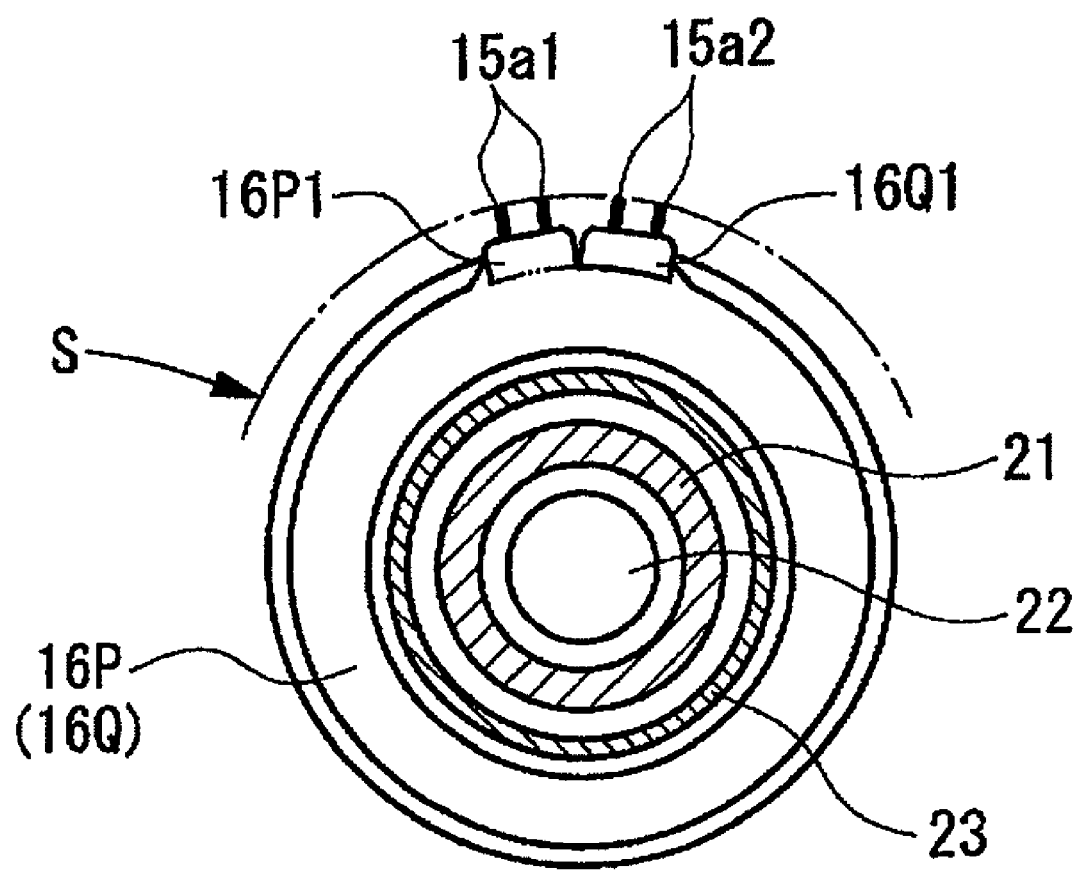
FIG. 4 is a sectional view taken along an A-A line in FIG. 3 for explaining the arrangement of the detecting coil.

FIG. 3 is a sectional view in an axial direction for explaining the arrangement of the detecting coil 15 of the torque sensor disposed in the gear box, and FIG. 4 is a sectional view taken along an A-A line in FIG. 3. In FIGS. 3 and 4, 21 denotes an output shaft and 22 denotes a torsion bar. On an outer periphery of the output shaft 21, a cylindrical member 23 having a plurality of windows 23a constituted by a nonmagnetic material such as aluminum and disposed at a regular interval in a circumferential direction is fixed to an end of the input shaft which is not shown.

On the other hand, the output shaft 21 is constituted by a magnetic material and a plurality of convex portions is formed in corresponding positions to the windows 23a of the cylindrical member 23.

Since the structure in which a change in a magnetic resistance generated between the windows 23a of the cylindrical member 23 constituted by the nonmagnetic material and the output shaft 2 constituted by the magnetic material through a torsion generated on the torsion bar 22 when a steering torque is applied is regarded to be a change in an inductance of the detecting coil 15 (including two detecting coils 15p and 15q) to detect a steering torque is the same as the well-known art described above with reference to FIGS. 8 and 9, description will be omitted.

Moreover, a coil yoke 16P accommodating the detecting coil 15p therein and a coil yoke 16Q accommodating the detecting coil 15q therein are disposed coaxially on the outer periphery of the cylindrical member 23 in the axial direction of the output shaft 21 in the gear box 11, and an output terminal 15a1 of the detecting coil 15p and an output terminal 15a2 of the detecting coil 15q have a structure in which tip portions bent to take an L shape are protruded outward from the opening portion 11e (see FIG. 1) provided on the gear box 11 respectively and are inserted into a corresponding through hole 18 of the circuit board of the control module CM.

The coil yokes 16P and 16Q are constituted annularly, and the detecting coil 15p accommodated in the coil yoke 16p includes a terminal holding portion 16P1 for holding the output terminal 15a1 and the detecting coil 15q accommodated in the coil yoke 16Q includes a terminal holding portion 16Q1 for holding the output terminal 15a2.

The two coil yokes 16P and 16Q are held rotatably around the shaft center of the output shaft in the gear box 11 and left and right parts in the axial direction are held by a guide member 11f and a pressing member 11g in the gear box.

The coil yokes 16P and 16Q are held rotatably around the shaft center of the output shaft in order to easily carry out an alignment in an insertion of a tip portion of the output terminal 15a (the output terminals 15a1 and 15a2) of the detecting coil 15 into the through hole 18 of the circuit board of the control module CM when the coil yokes 16P and 16Q are to be attached into the gear box 11. Even if the coil yokes 16P and 16Q are rotated, moreover, the L-shaped tip portion of the output terminal 15a (the output terminals 15a1 and 15a2) is provided on an inside of a moving track (shown in a circular arc S) of the output terminal 15a around the shaft center. By designing other components to be disposed on an outside of the circular arc S in the gear box 11, therefore, it is possible to prevent an interference of the coil yokes 16P and 16Q with the other components.

Figure 5:
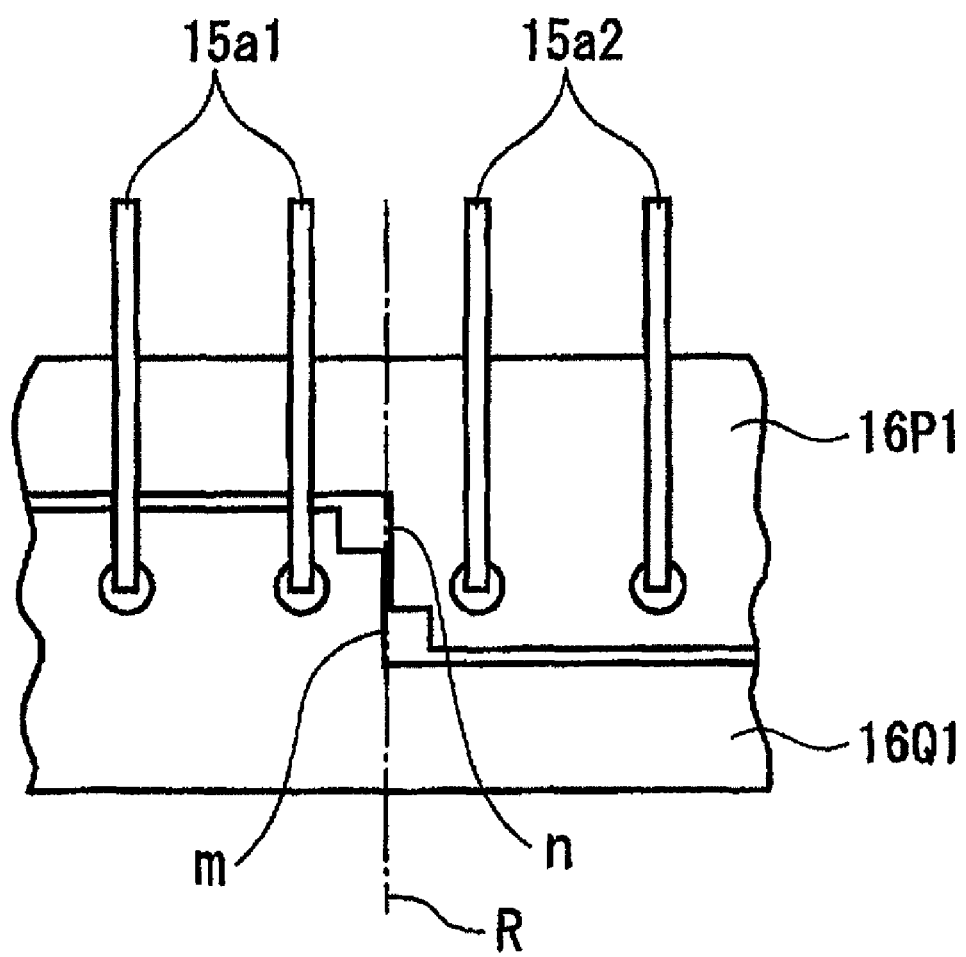
FIG. 5 is a view for explaining a structure for regulating a rotating angle formed by a rotation of a coil yoke around a shaft center.

FIG. 5 is a view for explaining a structure for regulating a rotating angle when the coil yokes 16P and 16Q are rotated around the shaft center, and a line R indicates a direction of a contact surface of the terminal holding portions 16P1 and 16Q1.

The contact surface is provided in a parallel direction to the direction of the shaft center of the output shaft and in a parallel direction to the rotating shafts of the coil yokes 16P and 16Q.

The terminal holding portion 16P1 for holding the output terminal 15a1 of the detecting coil accommodated in the coil yoke 16P and the terminal holding portion 16Q1 for holding the output terminal 15a2 of the detecting coil accommodated in the coil yoke 16Q have colliding step portions m and n formed on end faces in the direction of the rotating shaft respectively, and the coil yokes 16P and 16Q collide with each other through the colliding step portion m of the terminal holding portion 16P1 and the colliding step portion n of the terminal holding portion 16Q1 so that the rotating angle is regulated in such a manner that the output terminal 15a1 of the detecting coil accommodated in the coil yoke 16P and the output terminal 15a2 of the detecting coil accommodated in the coil yoke 16Q do not overlap with each other.

It is preferable to provide a positioning member between an end face of the guide member 11f in the gear box and the coil yoke 16P to abut on the end face, thereby regulating the rotating angle of the coil yokes 16P with respect to the guide member 11f.

Next, description will be given to the control module CM and an output terminal 215a of a detecting coil 215 of a torque sensor which are the structures of the feature portions according to the invention.

A circuit board of the control module CM attached to a module attaching member 213 is disposed on a perpendicular plane to shaft centers of an input shaft, a torsion bar and an output shaft which are provided coaxially. On the other hand, the detecting coil 215 of the torque sensor is provided around the output shaft disposed in a cylindrical member 211d, and a structure itself of the torque sensor is the same as the conventional structure described above with reference to FIGS. 8 and 9.

The output terminal 215a of the detecting coil 215 of the torque sensor is formed to take an L-shape including a base portion 215a1 extended vertically from an outer peripheral surface of the detecting coil 215 and a tip portion 215a2 bent at a right angle with respect to the base portion 215a1 (see FIG. 6), and the tip portion 215a2 is formed perpendicularly to the circuit board of the control module CM. Moreover, the output terminal 215a is set to be a round pin having a round section.

According to the structure, the tip portion 215a2 of the round pin having the round section can be inserted in a vertical direction into a through hole 218 to be a connecting portion of the circuit board of the control module CM, and the detecting coil 215 and the control module CM can be directly connected easily (see FIG. 1).

Figure 6:
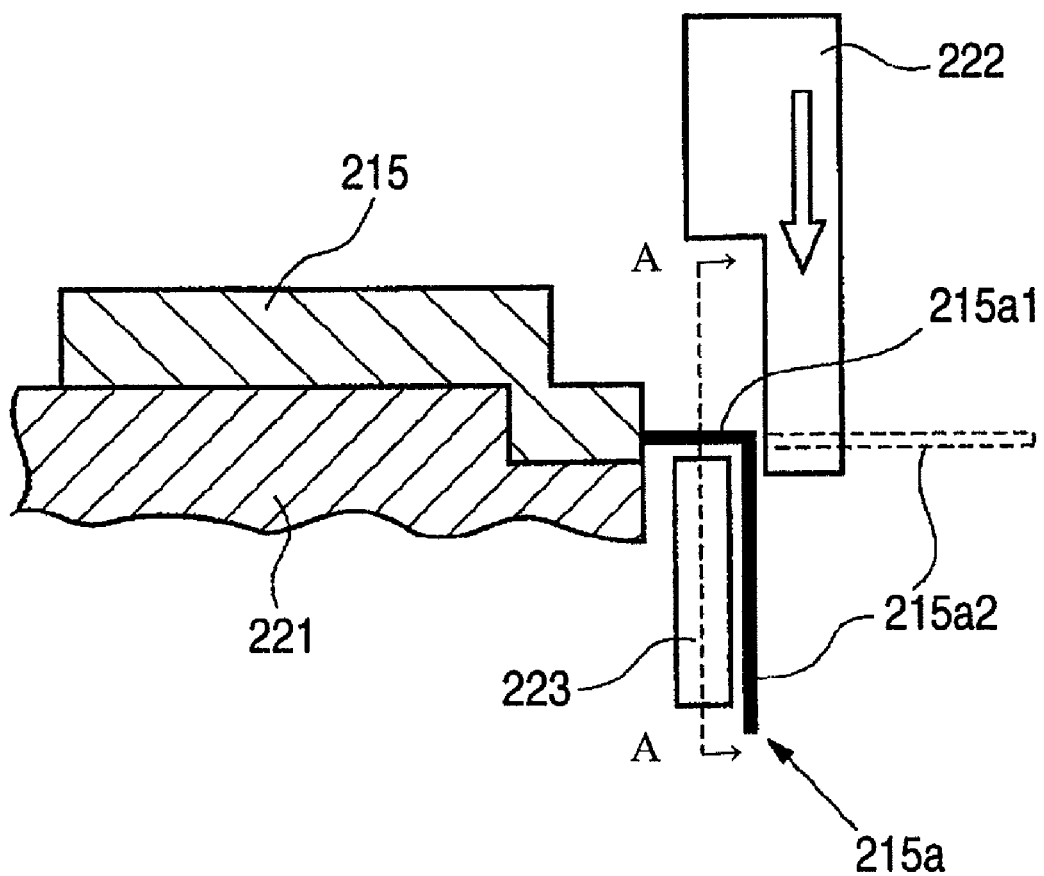
FIG. 6 is a front view for explaining a bend processing of an output terminal of the detecting coil.
Figure 7:
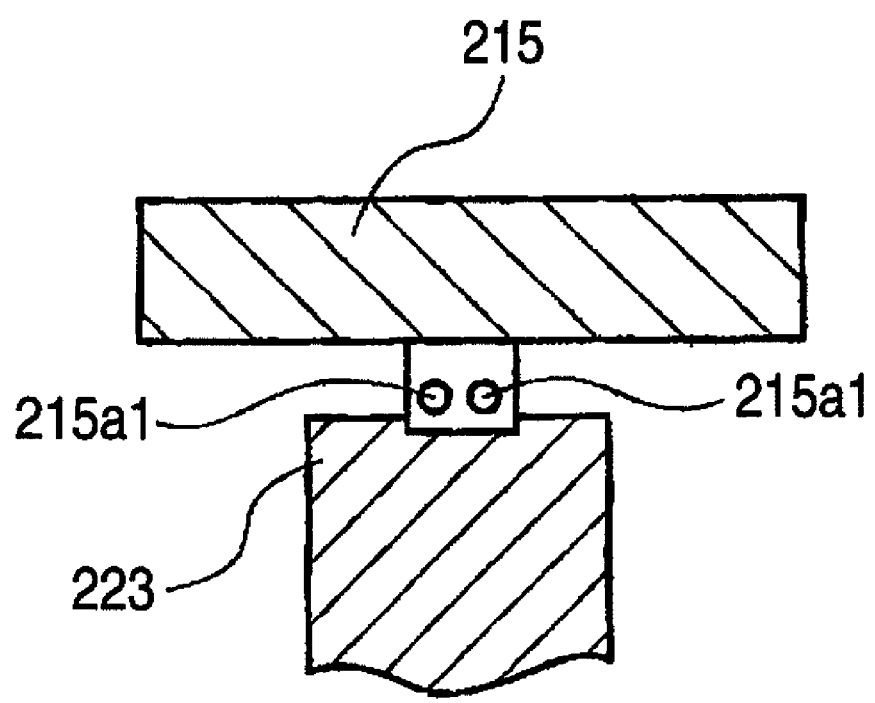
FIG. 7 is a sectional view taken along an A-A line in FIG. 6 for explaining the bend processing of the output terminal of the detecting coil.

With reference to FIGS. 6 and 7, next, description will be given to a bend processing of the output terminal of the detecting coil. FIG. 6 is a front view for explaining the bend processing of the output terminal 215a of the detecting coil and FIG. 7 is a sectional view taken along an A-A line in FIG. 6.

In FIG. 6, 221 denotes a base plate for fixing the detecting coil 215, 222 denotes a bending punch and 223 denotes a die for supporting the output terminal 215a. The detecting coil 215 is fixed onto the base plate 221, and the base portion 215a1 of the output terminal 215a supports the die 223 from below. Next, the bending punch 222 is pressed down along a side surface of the die 223 to bend the tip portion 215a2 of the output terminal 215a. In FIG. 6, the tip portion 215a2 of the output terminal 215a shown in a chain line is formed in a tip portion bent at a right angle with respect to the base portion 215a1 as shown in a thick solid line.

In this case, the section of the output terminal 215a is the round pin. When the base portion 215a1 of the output terminal 215a is supported through the die 223 from below, therefore, the base portion 215a1 of the output terminal 215a makes a line contact of an outer peripheral surface of a cylinder of the round pin and a die plane with respect to the die 223. Since a contact surface is small, it is possible to carry out bending with high precision.

While the description has been given to the embodiment in which the torque sensor according to the invention is applied to the electric power steering apparatus, it is apparent that the torque sensor according to the invention is not restricted to the application to the electric power steering apparatus but can be applied to toque sensors of other mechanical apparatuses.

While the invention has been described in detail with reference to the specific embodiment, it is apparent to the skilled in the art that various changes and modifications can be made without departing from the spirit and scope of the invention.

The application is based on Japanese Patent Application (JP-A-2006-055717) filed on Mar. 2, 2006 and Japanese Patent Application (JP-A-2006-055718) filed on Mar. 2, 2006 and contents thereof are incorporated by reference.

INDUSTRIAL APPLICABILITY

In a torque sensor, a torque detecting coil is constituted rotatably in a direction of shaft centers of input and output shafts, and furthermore, a member for regulating a rotating angle is provided to enable an arrangement of an output terminal of the detecting coil with high precision, and the torque detecting coil can easily be assembled into a gear box and an output terminal of the detecting coil can easily be connected to a control module.

Moreover, the control module of the torque sensor according to the invention is disposed perpendicularly to the direction of the shaft centers of the input and output shafts. When the gear box mounting the control module thereon is to be disposed in a small space, for example, an engine room, a space efficiency is increased. In an application to an electric power steering apparatus, it is possible to sufficiently maintain a shock absorbing stroke of a shock absorbing mechanism. Since the output shaft of the detecting coil of the torque sensor has a tip portion bent to take an L shape and formed perpendicularly to a circuit board of the control module, the detecting coil and the control module can be directly connected easily.

The invention claimed is:

1. A torque sensor of, an electric power steering apparatus comprising:

two pieces of detecting coils for detecting, as a change in an inductance, a torsion between input and output shafts disposed coaxially which is generated through a steering torque, and a control module connected to an output terminal of the detecting coil and processing a detection signal output from the detecting coil, wherein a circuit board of the control module is disposed perpendicularly to a direction of shaft centers of the input shaft and the output shaft which are disposed coaxially, the two pieces of detecting coils are disposed rotatably around the shaft centers in a housing in which the input shaft and the output shaft are accommodated, and the two pieces of detecting coils are accommodated in coil yokes respectively, and include a rotation regulating member for regulating mutual rotating angles.

2. The torque sensor of an electric power steering apparatus according to claim 1, wherein the detecting coil includes a terminal holding portion for holding the output terminal, and the rotation regulating member is formed in the terminal holding portion.

3. The torque sensor of an electric power steering apparatus according to claim 1, wherein the output terminal of the detecting coil has a base portion held in the terminal holding portion and a tip portion bent at a right angle with respect to the base portion and formed to take an L shape such that the base portion protrudes out from an opening portion of the housing and the tip portion is oriented in a direction in which the control module is attached to the output terminal.

* * * * *